United States Patent
Kumhyr et al.

(10) Patent No.: US 8,140,469 B2
(45) Date of Patent: Mar. 20, 2012

(54) JOURNALING TO CAPTURE WORKFLOW AND CONVERT TO WORKFLOW MARKUP LANGUAGE

(75) Inventors: David B. Kumhyr, Austin, TX (US); Jue Xue, Clarksville, MD (US)

(73) Assignee: International Business Machines Corporation, Armonk, NY (US)

( * ) Notice: Subject to any disclaimer, the term of this patent is extended or adjusted under 35 U.S.C. 154(b) by 1442 days.

(21) Appl. No.: 11/014,564

(22) Filed: Dec. 16, 2004

(65) Prior Publication Data

US 2006/0136430 A1    Jun. 22, 2006

(51) Int. Cl.
*G06F 7/00* (2006.01)

(52) U.S. Cl. ......... 707/602; 707/693; 707/705; 707/803

(58) Field of Classification Search .................. None
See application file for complete search history.

(56) References Cited

U.S. PATENT DOCUMENTS

| | | | | |
|---|---|---|---|---|
| 5,721,850 A * | 2/1998 | Farry et al. | ...... | 715/700 |
| 5,930,512 A | 7/1999 | Boden et al. | ...... | 395/710 |
| 6,020,886 A | 2/2000 | Jacober et al. | | |
| 6,380,954 B1 * | 4/2002 | Gunther | ...... | 715/764 |
| 6,775,819 B1 | 8/2004 | Hardikar et al. | | |
| 2002/0035606 A1 | 3/2002 | Kenton | ...... | 709/206 |
| 2002/0174340 A1 | 11/2002 | Dick et al. | ...... | 713/178 |
| 2002/0198890 A1 | 12/2002 | Jackson | ...... | 707/101 |
| 2003/0191769 A1 | 10/2003 | Crisan et al. | ...... | 707/100 |
| 2003/0217031 A1 | 11/2003 | Owen et al. | ...... | 707/1 |
| 2003/0225769 A1 | 12/2003 | Chkodrov et al. | ...... | 707/100 |
| 2003/0236690 A1 | 12/2003 | Johnston-Watt et al. | ...... | 705/7 |
| 2003/0236693 A1 * | 12/2003 | Chen et al. | ...... | 705/9 |
| 2004/0006403 A1 | 1/2004 | Bognanno | ...... | 700/109 |
| 2004/0008175 A1 | 1/2004 | Elder et al. | ...... | 345/100 |
| 2004/0015564 A1 | 1/2004 | Williams | ...... | 709/219 |

FOREIGN PATENT DOCUMENTS

CN    1368719    9/2002

OTHER PUBLICATIONS

"Gaining control of complexity. The standard for the data center", dcml.org.*
CN Patent office action dated Dec. 16, 2010 for application 2005800414256.

* cited by examiner

*Primary Examiner* — Tim T Vo
*Assistant Examiner* — Hasanul Mobin
(74) *Attorney, Agent, or Firm* — Yee & Associates, P.C.; Jeffrey S. LaBaw

(57) ABSTRACT

During performance of a process task, a journaling program is used to record keystrokes and mouse activities. A journal of the process task is then sent to a parser for conversion to a markup language, such as electronic business Extensible Markup Language (ebXML) or Data Center Markup Language (DCML). The markup language version of the task is then validated against business rules, operating policy, etc., providing code by which the task can be automatically performed.

27 Claims, 2 Drawing Sheets

JOURNALING TO CAPTURE WORKFLOW AND CONVERT TO WORKFLOW MARKUP LANGUAGE

BACKGROUND OF THE INVENTION

1. Technical Field

The disclosed invention relates to automating a workflow. More specifically, it relates to providing a system and method whereby a process can be captured in a journal and converted to machine code that can be automatically performed.

2. Description of Related Art

As the use of computers becomes more deeply entrenched in the daily lives of individuals and corporations, the need to use these expensive resources wisely becomes increasingly important. Management of information resources requires that the manager can monitor key resources, detect problematic conditions before they become critical, determine a response that fulfills objectives, and implement the response.

In early computer systems that used mainframe computers, every piece of the system was under the direct control of the information-processing (IP) group and management could monitor each and every piece of equipment and software. In contrast, an IP manager today of even a modest-sized company must manage one or more servers, a multitude of workstations, including portable computers, and network connections both internal to the company and to the World Wide Web. Additionally, IP managers must contend with many different software programs, including software that is deliberately purchased for the business, downloaded by employees, and maliciously sent to attack the system. Components of the system can exist in different buildings or halfway across the world. In a large corporation, the sheer number of decisions that must be made on a daily or weekly basis is staggering. Managing such a system requires that the system itself must be empowered to aid in the monitoring and problem-solving process.

Over the last decade, several companies have implemented programs that provide the structure and capabilities for managing computer systems. These programs can monitor processes and devices, keep records of desired results, note out-of-range parameters, recommend specific actions and implement them. However, for every task that is managed by the system, the instructions must first be planned and tested in advance. This in itself can be a tedious process. The systems manager must remember each of the many steps necessary for the task, record the steps, and finally test the results, making sure that none of the actions violates system protocols or business objectives. It would be advantageous to provide a means by which this task can be made easier.

SUMMARY OF THE INVENTION

A systems administrator performs a provisioning task while a journaling program records keystrokes and mouse activities. A journal of the task is then sent to a parser for conversion to a markup language, such as electronic business Extensible Markup Language (ebXML) or Data Center Markup Language (DCML). The markup language version of the task is then validated by the configuration management system, providing code by which the task can be automatically performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
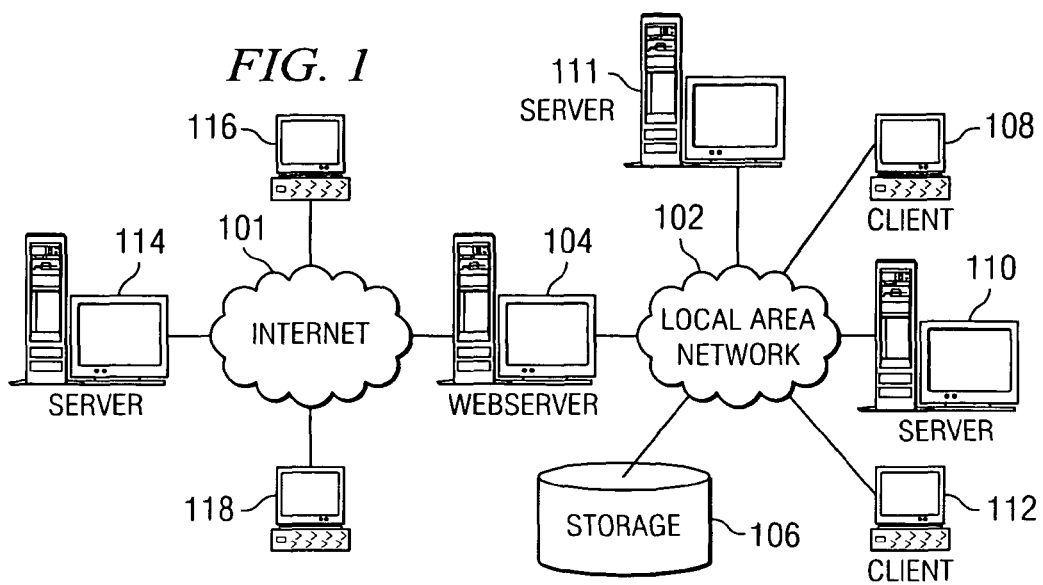
FIG. 1 discloses a network in which an exemplary embodiment of the disclosed invention can be implemented.

With reference now to FIG. 1, a system 100 is shown in which the inventive method can be implemented. In this example, a corporation maintains a local area network (LAN) 102 to which are attached a number of servers 104, 110, 111, each dedicated to given departments within the corporation, as well as workstations 108, 112 and storage 106. Server 104 is dedicated to supporting a website that is available on the Internet 101. Server 114 and computers 116, 118 are not part of LAN 102, but can access the website hosted on webserver 104.

Figure 2:
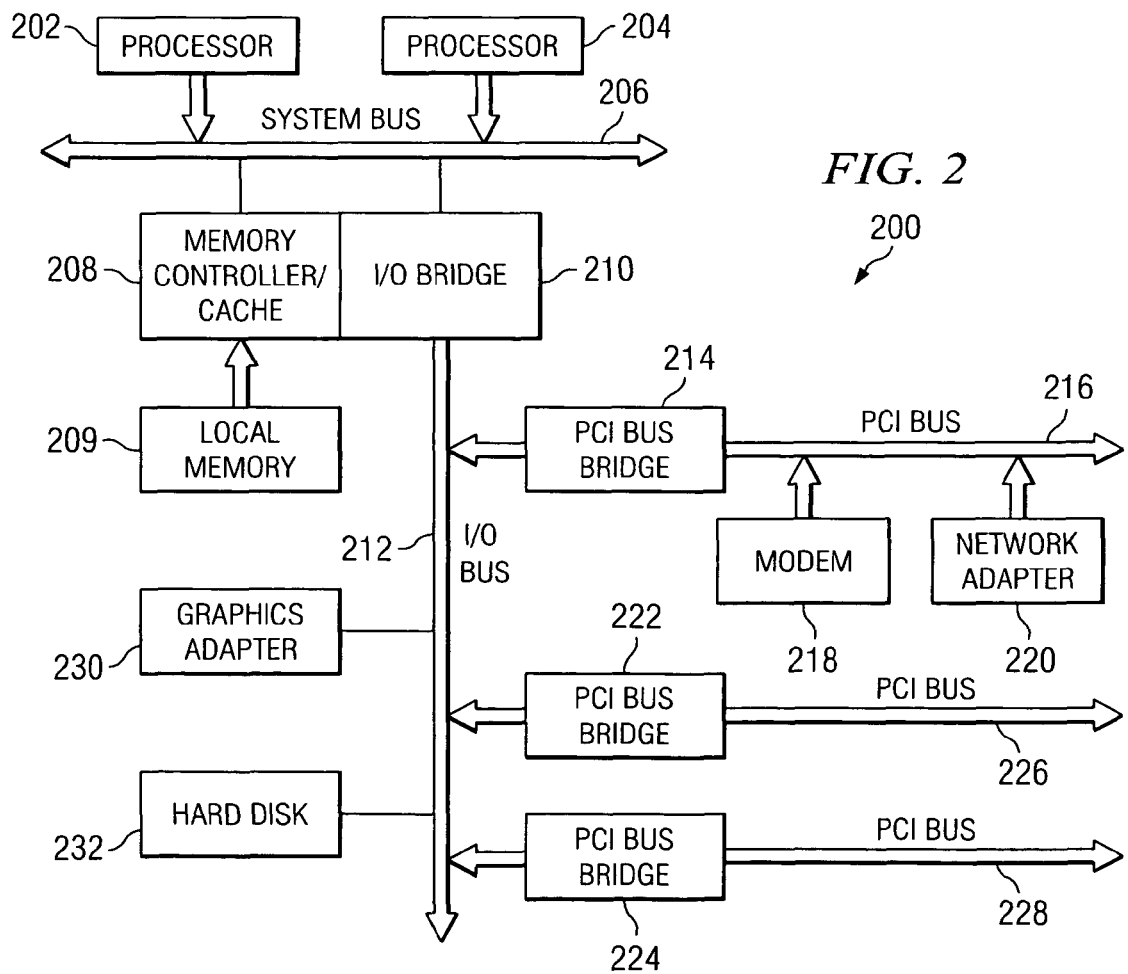
FIG. 2 discloses a server in the network of FIG. 1.

Referring to FIG. 2, a block diagram of a data processing system that may be implemented as a server, such as servers 104, 110, 111 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to computers and servers on the Internet in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries system, a product of International Business Machines Corporation in Armonk, N.Y., running the Advanced Interactive Executive (AIX) operating system or LINUX operating system.

Figure 3:
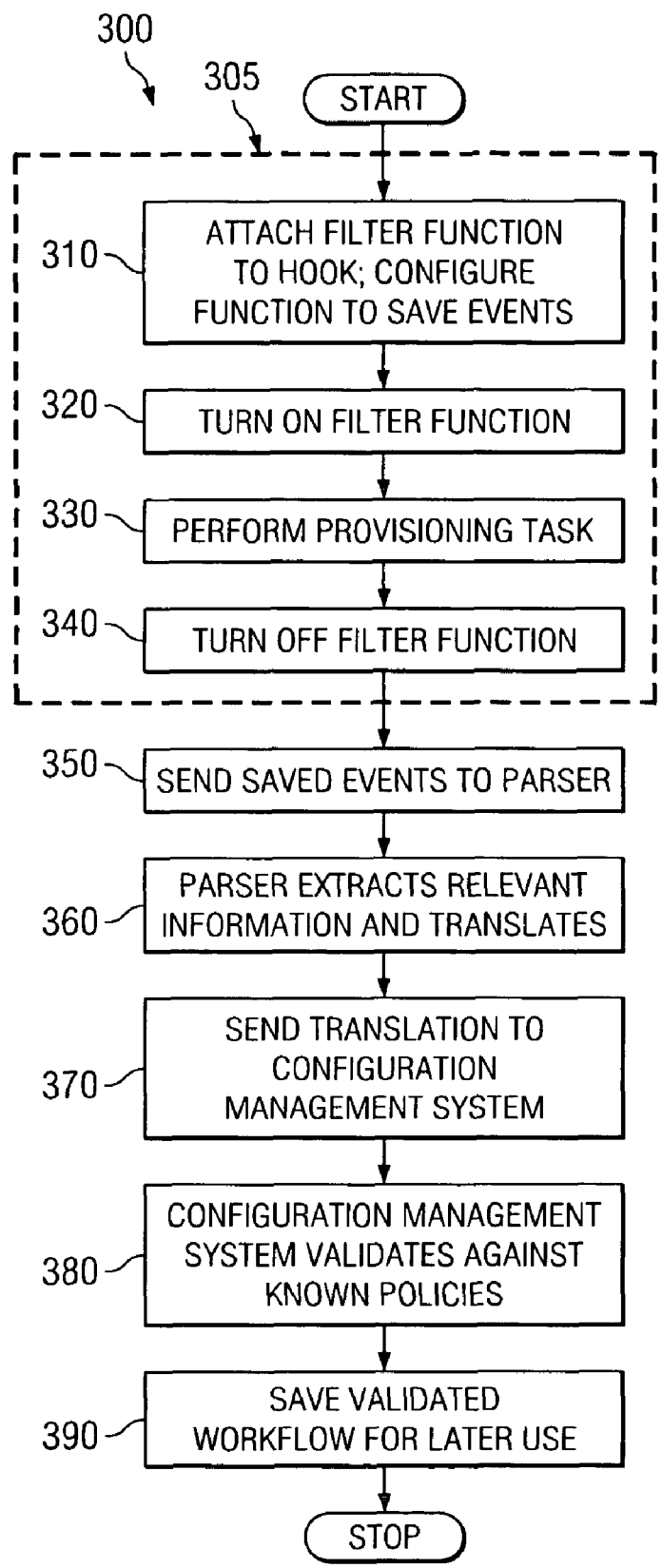
FIG. 3 discloses a flowchart of the actions taken in an exemplary embodiment of the invention.

With reference now to FIG. 3, a flowchart 300 showing the actions necessary to create a workflow for a provisioning task is disclosed according to an exemplary embodiment of the invention. This flowchart provides an overview of the process of recording the task and converting the record to a form that can be used later. The most effective way to document the workflow necessary to perform a given task is to perform the task and at the same time, capture the entries as they are made to the computer (step 305). This step is known as journaling and is composed of a number of sub-steps, each of which will be noted.

In this exemplary embodiment, the process will be described in terms of journaling on a Microsoft® Windows® operating system, although other operating systems perform journaling in a similar manner.

In Windows, it is possible to intercept an event, such as a message or keystroke, before the event reaches an application. This is done using a mechanism called a hook. The operating system defines hooks at several different locations within the system. When a piece of code called a filter function is attached to a hook, the hook sends any events that pass through this location to the attached filter function, which can then act on the event. Once the filter function has performed its actions, the event will continue on its way unless it has been deleted by the function. To intercept keyboard and mouse events, one attaches the desired filter function to the hook associated with these events. In the exemplary flowchart, it is desired to make a record of events passing the hook, so the filter function WH_JOURNALRECORD is attached to the hook associated with mouse and keyboard events. This filter function can save the events that pass through it to either memory or disk, so as part of this step, the filter is set to save to the desired location (step 310).

Once this filter function is attached or set, an application can use the two commands SetWindowsHookEx and UnhookWindowsHookEx to "turn on" or "turn off" the desired filter function. Therefore in the flowchart, when an administrator is ready to record a task, that person first turns on the journaling function using the SetWindowsHookEx command (step 320). At this point, all keystrokes and/or mouse movements will be recorded and stored. The administrator then performs the desired task (step 330), such as reconfiguring a server. Notably, one of the problems with writing any type of procedure from memory is that one may miss an important step and not discover the missing step until the procedure is tested. Using the technique of journaling, the administrator is not just recording a procedure; they are actually performing the procedure. If they make an error in entry, the incorrect results are quickly visible; if the administrator then has to back up and correct the error, those steps are recorded also. When the given task is completed, the filter function is turn off using the UnhookWindowsHookEx command (step 340).

At this point, a saved journal exists of the actions taken by the administrator to perform the desired task. It is worth noting at this point that more than just the mouse and keyboard inputs pass the hook. A large number of system messages are also caught, such as messages about changing displays, etc. Using the filter function, one can cause certain events to be ignored, if it is already known that these are unnecessary. The saved journal can also be examined and edited by the administrator at this point (step 345). The editing can remove errors in the original process, add, alter, or delete steps, combine the journal with other journals to create a larger process, etc.

The saved journal is then forwarded to a parser (step 350). The parser extracts the relevant information and reduces a lengthy journal (i.e., every keystroke and click, plus messages not needed and not removed at the filter) to a set of information that represents the essence of the journal, such as applications invoked, fields entered, etc. The parser then translates the extracted information into a language that can be used by the system (step 360). The language to which the information is translated can vary depending on the specific application used, but will generally be a form of extended markup language (XML), such as electronic business Extensible Markup Language (ebXML) or Data Center Markup Language (DCML), the latter of which is the most suitable for producing a workflow result. The output from the parser is executable code that can be used to make the desired task happen on the system. Because this translation is a routine that will be used many times, it is desirable to be sure that the task we have created does not violate any system policies. To validate the routine, the translation is sent to the configuration management system (step 370). The configuration management program checks the workflow against the policies for this system and either validates the workflow or notes that it contains errors (step 380). Once validated, the file is saved for later use (step 390).

It is noted at this point that large tasks are often composed of many small tasks that are performed repetitively. These small tasks can be saved as subroutines, so that a library of workflows can be assembled.

Exemplary Use

In this example, webserver 204 from FIG. 2 receives a steady stream of visitors during the day, but most of its activity occurs in the evenings and on weekends. Recognizing that the peak load on the web server occurs at times when others of their servers 211, 212 are generally inactive, the management would like to use these idle servers 211, 212 as extra web servers during peak loads.

In order to implement such a temporary use of the idle servers, it will be necessary to design and implement a procedure that includes each step of reassigning the server in the proper order. The procedure needs to include the steps of (a) making a copy of the current state of idle server, including all necessary settings and switches, (b) the server must be reconfigured to meet the needs of its temporary assignment as a web server, and (c) the server must then be integrated into the existing configuration of web servers while workflow management programs are apprised of its presence. Once the temporary assignment is complete, the follow-up procedure must include the steps of (d) restoring the original state of the server and (e) restoring the original configuration of the web servers and their management programs.

The system administrator is working to implement the task for reconfiguring a server, such as servers 211, 212 as temporary web servers. The system administrator can perform the steps of this method from one of the onsite servers 204, 210, 211 or from a remote computer that contains the proper permissions to access local area network 202, such as server 214. Rather than show the entire work product for a large task, only a small portion of the flow will be shown; however, it will be understood that additional entries move in the same manner.

Having initiated the journaling process on the server, the administrator moves the cursor to the start menu in the lower left of the screen and brings up the desired application, then proceeds to set the IP address for the system. Once this is completed, the administrator then closes the dialogue and the window and turns off the journaling, having captured these steps in the process of moving a system from one purpose to another. The journal produced is as follows:

| | |
|---|---|
| <Start recording> | |
| Journal | (what this is in user terms) |
| WM_MOUSEMOVE 192,30 | (mouse start position - random) |
| WM_MOUSEMOVE 10,10 | (mouse cursor move to lower left corner - the start menu) |
| WM_NCHITTEST | (mouse button single click - on the start menu) |
| WM_MOUSEMOVE 10,50 | (mouse cursor move to lower left corner - move up the menu) |
| WM_NCHITTEST | (mouse button single click - on the menu of the application) |
| WM_MOUSEMOVE 30,50 | (mouse over to where the application appears) |
| WM_NMCLICK | (mouse click in application window to bring up the IP dialogue —we can grab the window information and know what application this is) |
| EN_SETFOCUS | (focus in now in an edit field) |
| EN_CHANGE | (I typed "1" in the field) |
| EN_CHANGE | (I typed "9" in the field - it is now 19) |
| EN_CHANGE | (I typed "2" in the field - it is now 192) |
| IPN_FIELDCHANGED | (the control is telling windows the field contents have changed) |
| IPN_FIELDCHANGED | (the control is telling windows the field contents have changed again) |
| EN_CHANGE | (I typed "1" in the field - it is now 192.1) |
| EN_CHANGE | (I typed "6" in the field - it is now 192.16) |
| EN_CHANGE | (I typed "8" in the field - it is now 192.168) |
| IPN_FIELDCHANGED | (the control is telling windows the field contents have changed) |
| IPN_FIELDCHANGED | (the control is telling windows the field contents have changed again) |
| EN_CHANGE | (I typed "1" in the field - it is now 192.168.1) |
| EN_CHANGE | (I typed "0" in the field - it is now 192.168.10) |
| IPN_FIELDCHANGED | (the control is telling windows the field contents have changed) |
| IPN_FIELDCHANGED | (the control is telling windows the field contents have changed again) |
| EN_CHANGE | (I typed "1" in the field - it is now 192.168.10.1 - and I'm finished) |
| IPN_FIELDCHANGED | (the control is telling windows the field contents have changed) |
| IPN_FIELDCHANGED | (the control is telling windows the field contents have changed again) |
| EN_KILLFOCUS | (control is telling windows I'm done) |
| WM_CLOSE | (mouse click in application window to close it) |
| <end of journal> | |

For purposes of simplification, the stream shown above does not include the hundreds of extraneous messages that one would normally see in a journal file. When this journal record is sent to the parser, the parser will filter out extraneous material, such as where the mouse is on the screen and the messages that change the display. The parser will ignore the location of the mouse on the screen and the various windows that are pulled up as the mouse clicks on "Start menu"->"Settings"->"control panel", which are all extraneous to the end program. When an application is launched for "Network Settings", the window information is snooped to determine the application that is being used. In this example, the user is interested in invoking one dialogue —the IP settings dialogue. The parser can further detect that within the network-setting program, the administrator has invoked the IP settings dialogue and from the IPN_FIELDCHANGE messages, the parser knows that the IP address has been changed. From this section of journal, then, the parser has determined the program that was brought up and the field that was changed. The actual IP address that was entered will become a replaceable parameter used by the workflow engine and based on its rules.

The output from the parser will thus be a small but useable process for changing the IP address:

| | |
|---|---|
| WM_NMCLICK | (Which application to invoke) |
| WM_NMCLICK | (Which menu to invoke the IP dialogue) |
| EN_SETFOCUS | (Which filed to change) |
| WM_CLOSE | (Close) |

Using this file itself, it is possible to feed the instructions back into the system, using a function to playback these journal entries at the same hook at which they were captured. To do this, one would attach the function WH_JOURNALPLAY-BACK to the hook where these commands were received.

More importantly, however, we can combine these few instructions with other captured workflows and create a much larger workflow to handle the reassignment of a system to a new task. We could also have captured the entire workflow at one time, rather than stopping after only a small piece of the flow. The captured instructions are then converted to an appropriate workflow language. Two appropriate workflow languages are Business Process Execution Language (BPEL) and Data Center Markup Language DCML.

The translated workflow will be sent to the configuration management system for validation of the procedure. This involves verifying that the configuration as a web server has been done in accordance with the company's policies. Since an experienced person in this company's policies will generally enter the workflow, it would be expected that few errors would be detected at this point, but the validation provides a cross-check on the procedure. Once validated, the procedure can be stored and initiated whenever the need arises to convert a server to this use.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of creating an automated processing task, comprising the steps of:

responsive to user input actions, performing a processing task by a computer while creating a recording of said user input actions, wherein the user input actions are collected by a hook, and wherein the recording is generated by a filter function associated with the hook;

extracting, from said recording, a set of commands necessary to perform said automated processing task, wherein said automated processing task is an automated version of said processing task;

translating said set of commands to a workflow language to create a translated command set, wherein said translated command set is used to perform said automated processing task by said computer;

combining said translated command set with an additional translated command set to form a combined process, wherein the additional translated command set is created from a second recording of a second processing task; and storing said combined process in a storage device as a subroutine.

2. The computer implemented method of claim 1, wherein said steps are performed in a windowed operating system.

3. The computer implemented method of claim 1, wherein said translating step translates said set of commands to electronic business Extensible Markup Language or to Data Center Markup Language.

4. The computer implemented method of claim 1, further comprising the step of validating said translated command set against system policies.

5. The computer implemented method of claim 4, further comprising the step of saving said combined process set as a subroutine.

6. The computer implemented method of claim 1, wherein said extracting step extracts information regarding applications invoked, fields entered, virtual local area networks (VLANs), and subroutines called.

7. The computer implemented method of claim 1, further comprising the step of attaching a journaling function to a hook, wherein said journaling function collects said user input actions.

8. The computer implemented method of claim 7, wherein said performing step contains the steps of turning on said journaling function and turning off said journaling function.

9. The computer implemented method of claim 1, wherein said extracting and translating steps are performed by a parser.

10. A computer program product in a non-transitory computer recordable medium, said computer program product comprising:

computer usable program code for creating an automated processing task, said computer usable program code comprising:

first instructions for creating a recording of user input actions, wherein the user input actions are collected by a hook, and wherein the recording is generated by a filter function associated with the hook, said user input actions directed to commanding a computer to execute a processing task;

second instructions for extracting, from said recording, a set of commands necessary to perform said automated processing task, wherein said automated processing task is an automated version of said processing task;

third instructions for translating said set of commands to a workflow language to create a translated command set, wherein said translated command set is used to perform said automated processing task by said computer;

fourth instructions for combining said translated command set with an additional translated command set to form a combined process, wherein the additional translated command set is created from a second recording of a second processing task; and fifth instructions for storing said translated command set in a storage device as a subroutine.

11. The computer program product of claim 10, wherein said computer program product is configured to run on a windowed operating system.

12. The computer program product of claim 10, wherein said third instructions translate said set of commands to electronic business Extensible Markup Language or to Data Center Markup Language.

13. The computer program product of claim 10, further comprising sixth instructions for validating said translated command set against system policies.

14. The computer program product of claim 10, further comprising seventh instructions for saving said combined process set as a subroutine.

15. The computer program product of claim 10, wherein said second instructions extracts information regarding applications invoked, fields entered, virtual local area networks (VLANs), and subroutines called.

16. The computer program product of claim 10, further comprising eighth instructions for attaching a journaling function to a hook, wherein the said journaling function collects said user input actions.

17. The computer program product of claim 16, wherein said first instructions contain ninth instructions for turning on said journaling function and tenth instructions for turning off said journaling function.

18. The computer program product of claim 10, wherein said second instructions and said third instructions are performed by a parser.

19. A computer system comprising:
a processor;
a memory connected to be accessed by said processor;
an input device connected to said processor and said memory;
an output device connected to said processor and said memory;
a storage device connected to be accessed by said processor; and
a set of instructions for writing an automated processing task, said set of instructions containing:

first instructions for creating a recording of user input actions, wherein the user input actions are collected by a hook, and wherein the recording is generated by a filter function associated with the hook, said user input actions directed to commanding a computer to execute a processing task;

second instructions for extracting, from said recording, a set of commands necessary to perform said automated processing task, wherein said automated processing task is an automated version of said processing task;

third instructions for translating said set of commands to a workflow language to create a translated command set, wherein said translated command set is used to perform said automated processing task by said computer;

fourth instructions for combining said translated command set with an additional translated command set to form a combined process, wherein the additional translated command set is created from a second recording of a second processing task; and fifth instructions for storing said translated command set in a storage device as a subroutine.

20. The computer system of claim 19, wherein said processor runs a windowed operating system.

21. The computer system of claim 19, wherein said third instructions translate said set of commands to electronic business Extensible Markup Language or to Data Center Markup Language.

22. The computer system of claim 19, further comprising sixth instructions for validating said translated command set against system policies.

23. The computer system of claim 19, further comprising seventh instructions for saving said combined process set as a subroutine.

24. The computer system of claim 19, wherein said second instructions extracts information regarding applications invoked, fields entered, virtual local area networks (VLANs), and subroutines called.

25. The computer system of claim 19, further comprising eighth instructions for attaching a journaling function to a hook, wherein the said journaling function collects said user input actions.

26. The computer system of claim 25, wherein said first instructions contain ninth instructions for turning on said journaling function and tenth instructions for turning off said journaling function.

27. The computer system of claim 19, wherein said second instructions and said third instructions are performed by a parser.

* * * * *